No. 610,691. Patented Sept. 13, 1898.
M. RYDER.
APPARATUS FOR EXTRACTING AND TRANSPORTING TREES.
(Application filed Feb. 26, 1898.)
(No Model.) 3 Sheets—Sheet 1.
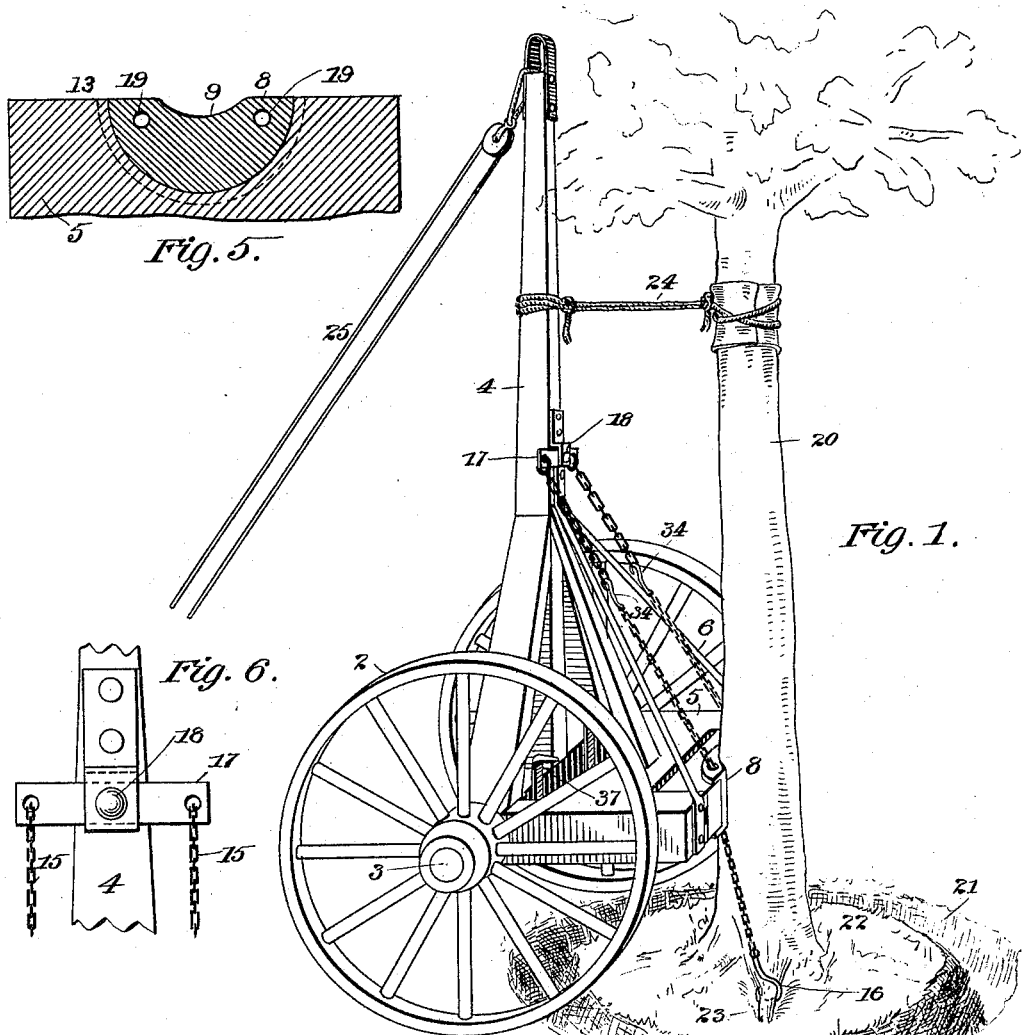
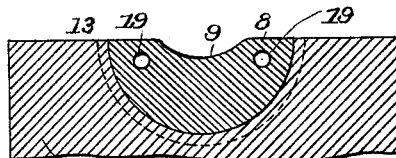
Fig. 5.
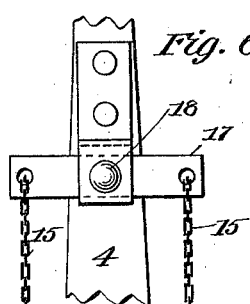
Fig. 6.
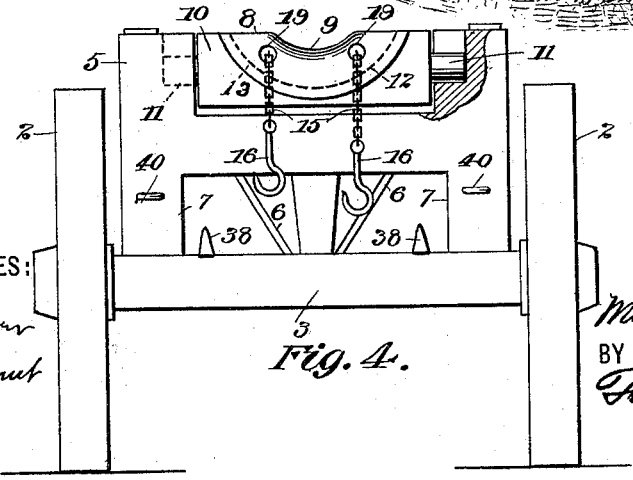
Fig. 4.
WITNESSES:
Frank S. Ober
S. M. Chesnut
INVENTOR
Malcolm Ryder
BY
Fowler & Fowler
ATTORNEYS.
THE NORRIS PETERS CO., PHOTO-LITHO., WASHINGTON, D. C.

No. 610,691. Patented Sept. 13, 1898.
M. RYDER.
APPARATUS FOR EXTRACTING AND TRANSPORTING TREES.
(Application filed Feb. 26, 1898.)
(No Model.) 3 Sheets—Sheet 2.
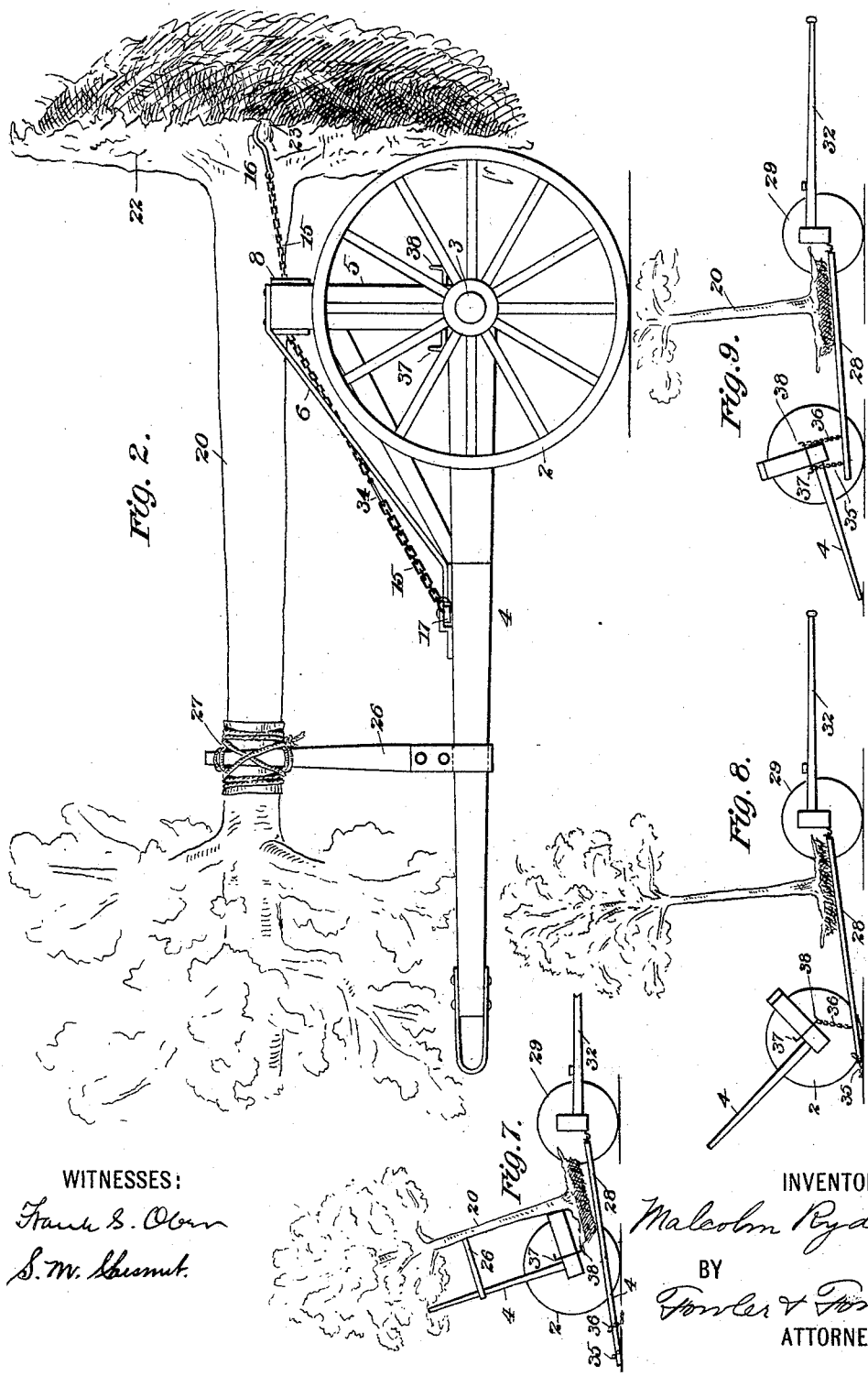
WITNESSES:
INVENTOR
Malcolm Ryder.
BY
Fowler & Fowler.
ATTORNEYS.

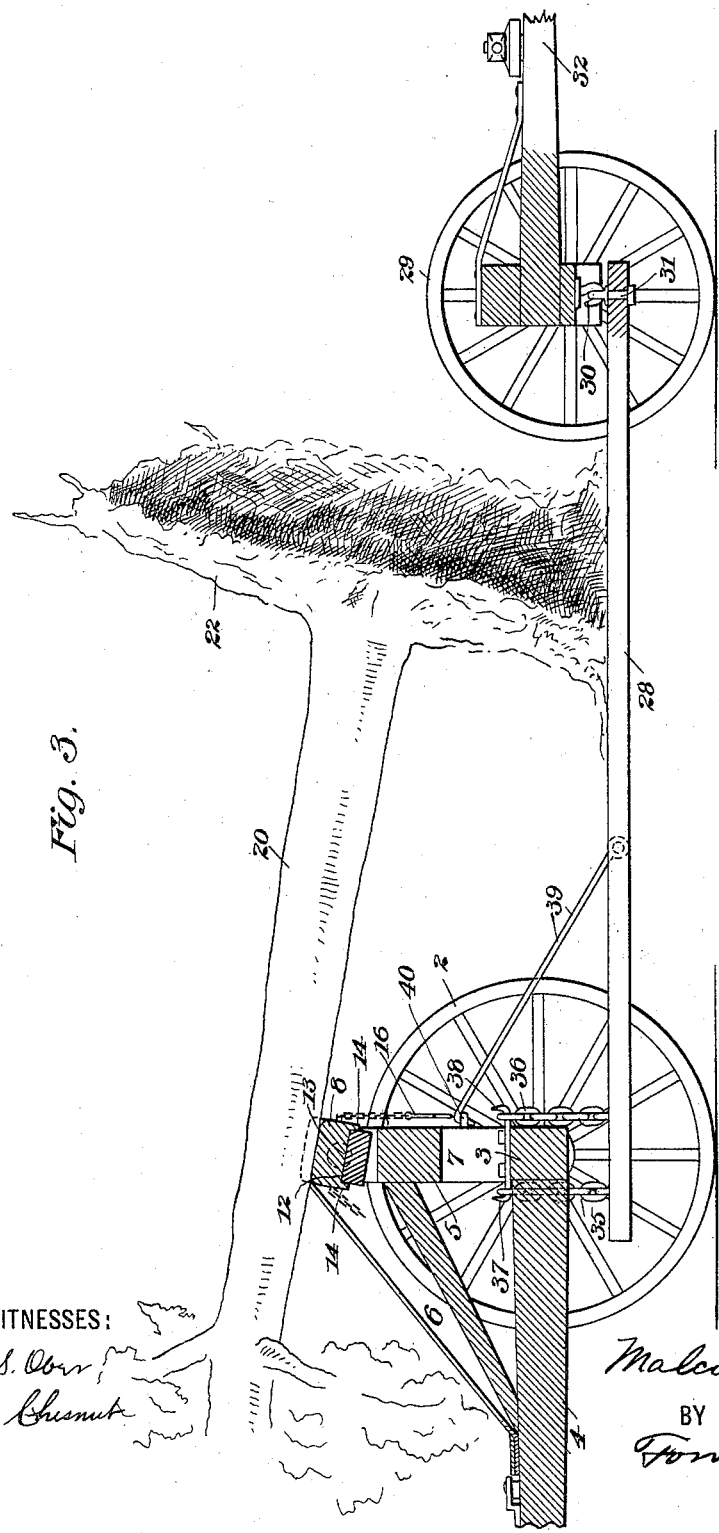

UNITED STATES PATENT OFFICE.

MALCOLM RYDER, OF NEW YORK, N. Y., ASSIGNOR TO THE NEW YORK LARGE TREE COMPANY, OF SAME PLACE.

APPARATUS FOR EXTRACTING AND TRANSPORTING TREES.

SPECIFICATION forming part of Letters Patent No. 610,691, dated September 13, 1898.

Application filed February 26, 1898. Serial No. 671,751. (No model.)

*To all whom it may concern:*

Be it known that I, MALCOLM RYDER, a citizen of the United States, residing at New York, (Pelham Manor,) Westchester county, State of New York, have invented certain new and useful Improvements in Apparatus for Extracting and Transporting Trees, of which the following is such a full, clear, and exact description as will enable any one skilled in the art to which it appertains to make and use the same, reference being had to the accompanying drawings, forming part of this specification.

My invention relates to apparatus for extracting trees from the ground and transporting them for the purpose of replanting them.

The principal objects of the invention are to facilitate the extraction of the tree with its roots and ball of earth and to expedite the loading of the tree upon the vehicle for transportation, at the same time distributing the load to better advantage and carrying the tree clear of the ground; and a further object is to prevent the bark of the tree from being rubbed off by the vehicle in transportation.

To these ends my invention consists in the various novel and peculiar arrangements and combinations of the several parts of the apparatus, all as hereinafter fully described, and then pointed out in the claims.

I have illustrated a type of my invention in the accompanying drawings, wherein—

Figure 1 is a perspective view of the tilting truck of the apparatus shown as tipped up, with its pole practically in vertical position and the tree secured to the truck ready to be extracted from the ground. Fig. 2 is a side view of the tilting truck bearing the tree in horizontal position after the same has been extracted. Fig. 3 is a side view, partly in vertical longitudinal section, of the four-wheeled wagon and the tree, which is shown as tipped over upon the saddle in position for being transported. Fig. 4 is a view of one end of the tilting truck, a portion of the structure being broken away to show one of the joints upon which the saddle swings. Fig. 5 is a detail view of a modified form of the saddle shown in vertical section, the plane of which extends transversely of the truck. Fig. 6 is a detail view in plan of the equalizing device for the chains used in extracting the tree. Figs. 7, 8, and 9 are small-sized views of the apparatus, showing the different relative positions of the parts in loading the tree upon the wagon for transporting it.

Referring to the drawings, in which like numbers of reference indicate like parts throughout, 2 2 are the wheels of the tilting truck, which wheels are mounted on an axle 3, from which extends forwardly a pole or arm 4. A bracket or bolster 5 is mounted above the axle and is made sufficiently high to keep the ball of earth and the roots of the tree a suitable distance above the ground when the pole of the truck is brought into horizontal position. This bolster 5 is braced to the pole 4 by means of struts 6 and at its lower central part is formed with an opening 7 immediately above the axle in order to leave a clear space above the axle at that point, for the purpose hereinafter referred to.

At the center of the upper part of the bolster 5 is mounted a saddle 8, which is hollowed out and rounded at 9 to afford a seat for the trunk of the tree when it is being extracted from the ground or transported. The saddle is so mounted that the bolster and saddle may have relative movements to prevent the trunk of the tree, which rests in the saddle, from shifting on the saddle and causing the bark to be rubbed off. It is for this special purpose that I provide for relative movement between the saddle and the truck, and I prefer to employ a universal or a gimbal joint between the two parts to accomplish this. To this end I employ a swinging member or frame 10, which swings freely on bearings 11 on a horizontal axis extending transversely of the truck, and upon this swinging member is arranged the saddle 8, the under side of which is curved on an arc 12 about a horizontal axis and slides in the plane of the arc on a similarly-curved surface 13 on the swinging member 10. The lower edges of the saddle are formed with downwardly-projecting flanges 14 for engaging the sides of the member 10 to keep the saddle from slipping off. It will now be understood that when the trunk of the tree rests in the saddle all shifting motion of the truck in traveling over the ground will be taken up by the relative movement between the saddle and the truck, and the tree and saddle are thereby prevented from moving on each other.

In the modification shown in Fig. 5 the saddle proper, 8, is mounted directly upon the bolster 5, as the swinging member 10 is dispensed with. In this form the sliding joint between the saddle 8 and the bolster is the same as that just described in reference to the saddle and the swinging member 10.

The truck which I have just described as carrying the saddle, and what I herein term the "tilting" truck, is provided with a pair of chains or cables 15, each of which is fixed by one end to the truck and has the other end provided with a grappling-hook 16 for engagement with the roots of the tree in extracting it. In order to make the tension on these pulling-chains alike, I provide an equalizer, which comprises a swinging bar 17, pivoted at 18 to pole 4 of the truck, and connect the chains to the respective ends of the bar, as shown. The pulling-chains are passed loosely through perforations 19 in the saddle. The perforations 19 are formed one near each end of the center, and the chains are thus adapted to move laterally with the saddle and the tree. Each of the chains 15 at some point of its length is provided with a hook 34, so that the chain may be shortened or lengthened by hooking it in different links.

To extract a tree with the apparatus described, the truck is moved up against the tree, (represented at 20 in Fig. 1,) the earth from near the roots of which has been previously excavated at 21, so as to leave a large ball of earth 22, within which the roots of the tree are embedded. The pole of the truck is tipped up in vertical position, and the truck is moved in so that the seat 9 of the saddle is brought firmly against the trunk of the tree. The grappling-hooks 16 are then hooked around the main root 23 at opposite sides of the tree, and the upper part of the trunk of the tree is fastened to the pole of the truck by a rope or other suitable connection 24. A block and tackle 25 is then attached to the upper end of the pole, and by means of it the pole is gradually drawn down into horizontal position, thereby prying the tree out of the ground. If the tree is to be carried a short distance, it may be transported on this truck, as shown in Fig. 2, the prop 26 having first been mounted on the pole and lashed to the trunk of the tree by a rope 27 to sustain the upper part of the tree and steady it. This prop 26 is adjustably mounted on the pole, so that it may be set at any point along the length of the pole, so that it may be locked to the pole by any suitable means in order to secure it against slipping thereon in transporting the tree. This prop is dispensed with when the tree is transported upon the four-wheeled wagon, which I will now describe. When the tree is transported upon the tilting truck, the pulling-chains 15 remain attached to the roots to prevent the tree from slipping back off the truck.

The body 28 of the wagon consists in a platform the forward end of which is attached to the forward truck 29 by means of a hook 30 on the axle and a swivel-eyebolt 31 on the platform. This forward truck 29 has wheels smaller than the rear truck and is provided with a tongue 32.

When the tree is placed upon the wagon-body 28, as will be hereinafter explained, it becomes necessary to raise the rear end of the body clear of the ground and to attach it to the tilting truck, which then becomes the rear truck of the wagon. I provide the following means for gradually raising the wagon-body at its rear end:

Upon each side of the rear end of the body 28 is arranged a pair of chains 35 36, which are attached to the body at some little distance from each other. Considering one pair of the chains, one of them, 35, is attached quite near the end of the wagon-body and is designed to be connected with a hook 37, projecting rearwardly from the axle 3 of the rear truck, and the other chain, 36, attached to the wagon-body at a point some distance farther in from the end to coöperate with the hook 38, projecting inwardly from the axle 3 of the truck, as is shown in Fig. 3. Each pair of the chains 35 36 has a corresponding pair of hooks 37 38, and the chains are sufficiently long to reach from the ground up to the hooks on the axle. When it is desired to raise the rear end of the wagon-body into its proper position above the ground for transportation, the forward truck and the wagon-body and the tilting truck are brought into the relation shown in Fig. 8, and in which the tilting truck spans the end of the wagon-body, which then rests upon the ground. The pole of the tilting truck is then tipped up and the inner pair of chains 36 are each drawn taut and connected with the corresponding inner hooks 38. The pole of the truck is then drawn down, thereby raising the wagon-body and placing the outer hooks 37 at a lower point than the inner ones 38, whereupon the other pair of chains 35 are drawn taut and connected with the outer hooks 37, respectively, as shown in Fig. 9, and the pole of the truck is again tipped up, and this causes the wagon-body to be raised still higher at its rear end. This latter movement slackens the inner pair of chains 36, which are then disengaged and drawn taut and again hooked on the inner hooks 38, so that when the pole is tipped down again the wagon-body is raised still higher. This alternate tipping of the truck and connecting therewith of the inner and outer chains thus serves to gradually raise the wagon-body to the desired position for transportation, as shown in Fig. 3. When the wagon-body is in its proper position, a long hook 39 at each side of the wagon-body is hooked into an eye 40 on each side of the bolster 5 of the truck. (See Figs. 3 and 4.) This connection of the hooks 39 prevents a too free movement of the wagon-body on the chains 35 36, by which it is suspended. I have shown the hooks 37 and 38 as being formed by the upturned ends of a bar placed across the axle 3 and bolted thereto, as shown in Figs. 1 and 3; but of course separate hooks may be used. The opening 7 in the bolster permits of a more ready manipulation of the chains 35 36 in unhooking and rehooking them.

To load the tree upon the wagon for transportation, the tilting truck carrying the tree in the manner shown in Fig. 2, for instance, and the wagon-body and forward truck are brought together in the relation shown in Fig. 7, so that the ball of earth 22 stands well forward over the wagon-body. The tree is then stood upon the wagon-body and the tilting truck is detached therefrom and moved back into the position shown in Fig. 8. Then the rear end of the wagon-body is raised by means of the chains 35 36 in the manner already described until it assumes the position shown in Fig. 3, whereupon the tree is tipped back and its trunk placed in the saddle 8 in the position shown in Fig. 3. To steady the upper part of the tree, any suitable connection, such as the rope 24, (shown in Fig. 1,) may be attached between the pole 4 and the trunk of the tree. A team is then hitched to the tongue 32 of the forward truck to draw the wagon, the tree being maintained in the position shown in Fig. 3 during the transportation and all parts thereof being kept clear of the ground.

In some instances I transport the tree mounted upon the tilting truck, as shown in Fig. 2, by placing the forward truck 29 under the end of the pole 4 and connecting it thereto by an ordinary king-pin. This affords a very expeditious way of carrying the tree a short distance.

In order to plant the tree, the trée is disconnected from the pole 4 of the rear truck and stood on the ball of earth on its base on the wagon-platform. Then the tilting truck is detached from the wagon-body, which is let down upon the ground, and said truck is rolled up against the tree, as shown in Fig. 7, and it is again taken up by resting the trunk of the tree against the saddle and lashing the upper part of the pole to the truck. It may then be rolled away to the place where it is to be planted, and as the ball of earth is then well clear of the ground and as the tree is adjusted well up on the truck the ball of earth will clear the ground even though the truck be tipped up with its pole in vertical position, so that the tree may be thus moved around while standing vertically, and this enables the tree to be readily and quickly located in a given line when planting it.

By virtue of my invention the tree can be readily extracted and loaded on the wagon, and the ball of earth can be easily placed at any desired point on the wagon-body, so as to distribute the load in the most advantageous way. The branches of the tree are kept well elevated and are thereby prevented from dragging on the ground. At the same time the relative movement between the saddle and the truck prevents relative shifting of the trunk of the tree and saddle and thereby saves the tree from being barked.

Having thus described my invention, what I claim, and desire to secure by Letters Patent, is—

1. In an apparatus of the class described, a vehicle having a movable saddle mounted thereon, said saddle adapted to be engaged by the tree, the said saddle and vehicle having a relative shifting motion to prevent relative movement between the tree and saddle.

2. In an apparatus of the class described, a tilting truck provided with a movable saddle upon which the tree rests, the said saddle and truck having relative motion to prevent the tree and saddle from shifting on each other.

3. In an apparatus of the class described, the combination of chains or cables for engaging the roots to extract the tree, and equalizing mechanism for said chains or cables to maintain uniform tension on the same.

4. In an apparatus of the class described, a truck provided with a movable saddle on which the tree rests, said saddle and truck having relative motion to prevent relative movement between said saddle and the tree, a set of chains or cables attached to the truck and passing loosely through said saddle for engaging the roots of the tree in extracting it.

5. In an apparatus of the class described, a truck provided with a movable saddle on which the tree rests, said saddle and truck having relative motion to prevent relative movement between said saddle and the tree, a set of chains or cables attached to the truck and passing loosely through said saddle for engaging the roots of the tree in extracting it, and equalizing mechanism for said chains or cables to maintain uniform tension on the same.

6. In an apparatus of the class described, the combination of a truck having a rocking saddle mounted thereon so that the truck and saddle rock relatively to each other in a plane extending transversely of the truck.

7. In an apparatus of the class described, the combination of a truck having a saddle mounted thereon and adapted to rock in different planes relatively to the truck.

8. The combination of a truck provided with a pole and having a bolster or bracket mounted upon the axle thereof for supporting the trunk of the tree, a prop mounted upon the pole of said truck for sustaining the upper end of the tree, and a second truck provided with a tongue and adapted to be attached to the pole of the first-mentioned truck for transporting the tree, substantially as and for the purpose set forth.

9. In a vehicle for transporting trees, the combination of a forward truck and a platform 28 attached thereto, a tilting rear truck provided with an arm or pole, a bolster mounted on said rear truck for supporting the tree, one or more pairs of hooks 37, 38 mounted upon said rear truck parallel with the pole thereof and located one to the rear side and the other to the forward side of the axle of said truck, a pair of detachable chains 35, 36 secured to the rear end of said platform 28 and adapted to be alternately engaged with the said hooks 37, 38, respectively, as the rear truck is tilted up and down for raising the rear end of the platform step by step to load the tree on the platform, substantially as and for the purpose set forth.

10. In an apparatus of the class described, a truck provided with a bolster, a saddle 8 formed with a seat 9 for receiving the trunk of the tree and having its under side curved and adapted to slide in a correspondingly-curved surface on said bolster, substantially as and for the purpose set forth.

11. In an apparatus of the class described, the combination of a two-wheeled truck provided with a pole 4, a bolster mounted directly above the axle of said truck for receiving the trunk of the tree and adapted to carry the same a considerable distance above said axle, and an attaching device mounted upon said pole for securing the upper part of the trunk of the tree in fixed relation to the pole, substantially as and for the purpose set forth.

12. In an apparatus of the class described, the combination of a two-wheeled truck provided with a pole, a bolster mounted upon the truck for receiving the trunk of the tree, a swinging equalizing-bar 17 mounted upon said pole, and a set of chains 15, 15 secured respectively to the ends of said equalizing-bar, whereby the tension on the pulling-chain may be maintained uniform, substantially as and for the purpose set forth.

In testimony whereof I have hereunto set my hand, this 19th day of February, 1898, in presence of the two subscribing witnesses.

MALCOLM RYDER.

Witnesses:
A. M. HAYES,
SAMUEL M. CHESNUT.